United States Patent [19]

Seger

[11] 3,735,253
[45] May 22, 1973

[54] METHOD AND MEANS FOR MEASURING ELECTRODE RESISTANCE

[75] Inventor: Edward J. Seger, Apollo, Pa.

[73] Assignee: Aluminum Company of America, Pittsburgh, Pa.

[22] Filed: Sept. 23, 1971

[21] Appl. No.: 183,117

[52] U.S. Cl. .................................................. 324/64
[51] Int. Cl. .............................................. G01r 27/14
[58] Field of Search ........................................ 324/64

[56] References Cited

UNITED STATES PATENTS

| | | | |
|---|---|---|---|
| 2,531,088 | 11/1950 | Thompson | 324/64 |
| 3,611,125 | 10/1971 | Sharon et al. | 324/64 |
| 2,896,159 | 7/1959 | Webster | 324/64 |
| 3,192,474 | 6/1965 | Cherry | 324/64 X |
| 3,283,240 | 11/1966 | Spady | 324/64 X |
| 2,142,619 | 1/1939 | Sciaky | 324/64 |
| 3,207,981 | 9/1965 | Marsh et al. | 324/64 X |
| 3,287,637 | 11/1966 | Keller | 324/64 X |

FOREIGN PATENTS OR APPLICATIONS

| | | | |
|---|---|---|---|
| 575,426 | 4/1933 | Germany | 324/64 |
| 250,321 | 6/1970 | U.S.S.R. | 324/64 |
| 569,174 | 1/1933 | Germany | 324/64 |

*Primary Examiner*—Stanley T. Krawczewicz
*Attorney*—Elroy Strickland

[57] ABSTRACT

A method and apparatus for measuring the electrical resistance of a carbonaceous electrode. The apparatus includes a plurality of current carrying and voltage measuring probes for electrically contacting a surface of the electrode over a broad area. A second current carrying means is placed in electrical contact with the electrode at a location spaced from the surface contacted by the probes, and a voltage source is connected between the second current carrying means and the probes to apply a potential across the electrode and thereby direct current through the electrode. Current flows through the electrode along a plurality of paths between the current carrying means and the plurality of probes. The amount of current flow in each path, and the voltage drop across the electrode are measured to determine the electrical resistance of the electrode between the location on the surface contacted by the current carrying means and the electrode surface contacted by the probes.

6 Claims, 4 Drawing Figures

INVENTOR
Edward J. Seger
BY
*E. Strickland*
ATTORNEY

Patented May 22, 1973  3,735,253

METHOD AND MEANS FOR MEASURING ELECTRODE RESISTANCE

BACKGROUND OF THE INVENTION

The invention relates to a method and a device or apparatus particularly suitable for accurately measuring the electrical resistance of large electrodes made from carbonaceous materials, such as petroleum coke and coal tar pitch, though the invention is not limited thereto.

The electrical resistance of electrodes in the production of aluminum and other metals by electrolysis is an important economic factor in the overall operating efficiency of the electrolytic cells in which the metal is produced. As is well known in the aluminum producing art, the electrolytic cells employ a large number of carbon anode blocks vertically suspended in the bath of the cell from an overhead bus structure. The bus structure, as well as supporting the anodes, handles large amounts of electrical current, this current being introduced into the cell through the anodes. Since a voltage drop across one or more of the anode wastes power in the form of heat, the lower the conductivity of the anode the greater the power cost per pound of aluminum produced in the cell. Further, productivity of a cell is determined by how much current can be passed through it without overheating. Therefore, excess heat generated in a low conductivity anode not only raises power costs but also and more important limits productivity by reducing the current carrying capacity of the cell.

The electrical conductance and resistance of an anode block depends in large degree upon its internal structure. The object, of course, in making anodes, is to form the block with a minimum of internal voids and laminations so that an essentially solid, homogeneous structure is provided, the solid structure providing the shortest possible paths for current flow through the anode.

Anodes are usually made by first mixing dry petroleum coke with a binder of coal tar pitch, and then pressing the mixture under substantial force in a mold. Thereafter the pressed mixture is baked in a furnace, the baking process carbonizing the pitch to form a relatively solid, homogeneous block structure. However, in the process of pressing the mixture, air is often trapped in the mixture which leaves internal voids and horizontal laminations of the mixed coke and pitch. In addition, there is some elastic deformation of the coke particles with pressing so that the particles tend to return to their original configuration after pressing to cause layer separation of the coke-pitch mixture.

Heretofore, however, it has been virtually impossible to determine the quality of anode block with any degree of accuracy and reproducibility. In testing an anode for resistance, the practice has generally been to use a single current carrying probe and a single voltage probe manually held against the surfaces of the anode. The probes were moved about the surfaces to obtain a plurality of readings representing different portions of the anode. Such a method and means produce excessive data scatter due primarily to the non-uniform application of pressure by personnel using the probes, and the arbitrariness of the locations on the anode chosen for testing. For example, a person using a single probe, might first place it at a point where the current path is interrupted by a void in the anode, whereas, the next point for checking would provide a current path through solid material thereby providing a lower resistance measurement. The same is true of laminations. Across the laminations, the resistance measured would be high in comparison to a resistance measurement along the length of the lamination; lengthwise, resistance would be low in comparison.

Further, the anode is ideally tested for electrical resistance in place in an operating cell since it is the operating anode that must perform efficiently in supplying current to the cell for the metal reduction process. As can be appreciated, it is difficult if not impossible to regularly place a probe or probes against the bottom surface of an anode disposed within a cell and located directly in an electrolytic bath.

BRIEF SUMMARY OF THE INVENTION

The present invention is directed to a method and device for accurately measuring the resistance of electrodes, the above discussed anodes for example, and for determining the effects of changes in the process of making the anodes. Briefly, the device comprises a plurality of spaced apart, current carrying and voltage indicating probes for engaging at least one surface of the anode over a broad area. An opposed portion or surface of the anode is contacted either by a second plurality of probes or a metal stub, in the case of stubbed anodes. A source of potential is connected to the probes to apply a voltage across the anode, and to direct current flow through the anode along a plurality of current paths between the opposed anode surfaces. The average voltage drop across the anode is measured by a potentiometric voltmeter connected between the voltage indicating probes contacting the opposed surfaces. An ammeter is connected in the circuit of each current carrying probe to measure the current in each of the current flow paths through the anode. In this manner, the electrical resistance of the anode is quickly and accurately determined (via ohm's law) over a broad cross sectional area thereof, i.e., the area circumscribed by the plurality of probes. Voids within the anode are indicated by low current flow, and an excessively laminated structure shows a generally reduced current flow through the anode.

Because of the effect of the internal structure (i.e., quality) of the anode upon its electrical resistance, the device of the invention provides a means for determining the effects of changes in the process of making the anodes. Process changes include variations in pitch content, the force at which the mixture of pitch and coke is pressed, baking time and temperatures, and the position of individual anodes within baking kilns.

The invention includes further a method for obtaining a correction factor which permits the determination, at room temperature, of the electrical resistance of electrodes at operating temperatures. The correction factor is obtained by the measuring of the difference in resistance between the electrode at room temperature and the same electrode heated in an oven to a temperature, varying from top to bottom, approximating that encountered in an operating cell. The difference in resistance between the heated and room temperature electrode is then used, as the correction factor, to measure the electrical resistance of further electrodes to determine, at room temperature, their resistance at the operating temperature.

THE DRAWINGS

The invention, along with its objectives and advantages, will be best understood from consideration of the following detail description in connection with the accompanying drawings in which.

PREFERRED EMBODIMENTS OF THE INVENTION

Figure 1:
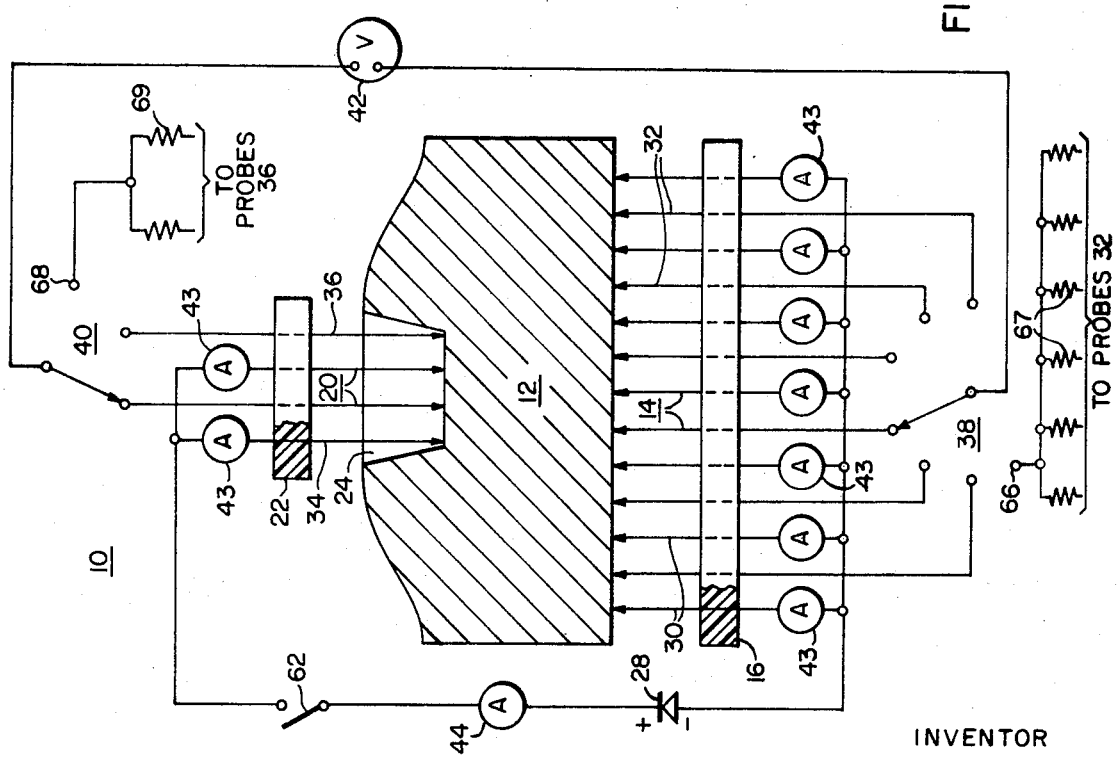
FIG. 1 is a circuit diagram showing the resistance measuring device of the invention engaging opposed surfaces of an anode to be tested for its resistance to current flow.

Referring now to the drawings, FIG. 1 shows schematically a device 10 for measuring the electrical resistance of an unstubbed anode 12. The device comprises a plurality of electrically conductive probes 14 supported in a spaced apart manner by a rigid, electrically insulating board structure 16 (described in greater detail hereinafter) beneath the bottom surface of the anode. As indicated in the plane view of FIG. 4, the probes are spaced in two mutually perpendicular directions across the board structure with the voltage probes (shown as an X) uniformly dispersed among the current probes (shown as small circles).

Figure 2:
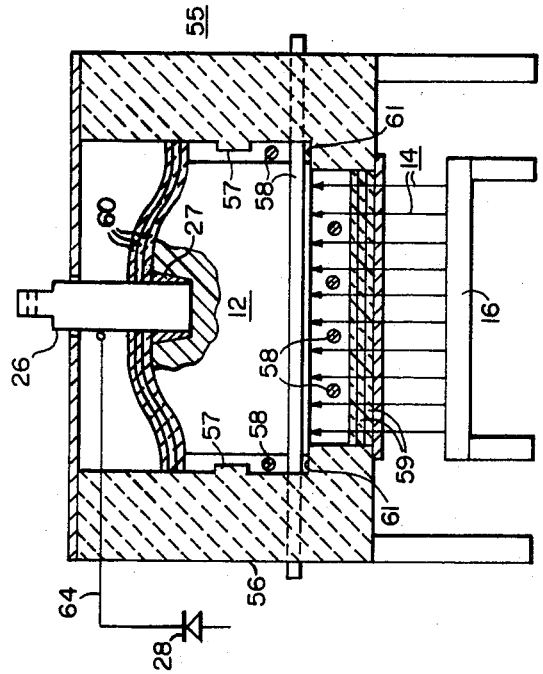
FIG. 2 is a sectional view of an oven containing a stubbed anode (in elevation), with the resistance measuring device of the invention located beneath the oven and in electrical contact with the bottom surface of the anode.

A second group or plurality of spaced apart probes 20 are supported in a second but smaller electrically insulating board 22 above the anode 12 for disposition in a stub hole or recess 24 provided in the top of the anode. The recess is provided to receive a metal stub 26, such as shown in FIG. 2, which stub, when fixed in the recess by a cast collar of iron 27, supports the anode in a cell from an overhead bus structure (not shown). In a manner similar to the probes 14, the probes 20 are spaced apart in several directions so that the bottom surface of the recess is electrically contacted over a broad area thereof when the probes 20 are disposed in the recess to engage the bottom surface of the recess.

Between the two groups of probes 14 and 20 is connected a power source 28, only representatively shown in FIG. 1 by a single diode. The power source is preferably a direct current source, as indicated by the diode, but an alternating current source could be used. An adjustable, zero to 500 ampere direct current power supply has been found satisfactory for the purposes of the invention. With the use of a direct current source, the lower group of probes become negative probes, and the upper group 20 become positive probes. The two surfaces contacted by the two probe groups correspondingly assume the respective potentials thereof.

Figure 4:
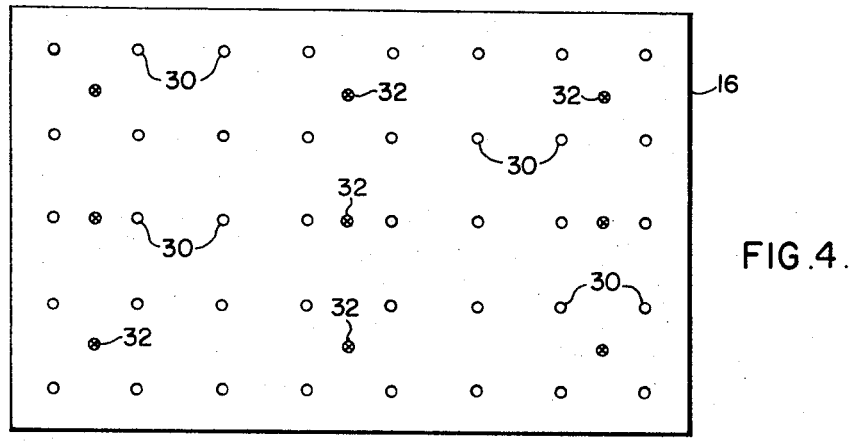
FIG. 4 is a plane view of a group of probes employed to electrically contact the bottom surface of the anode shown in FIGS. 1 and 2 in accordance with principles of the invention.

The positive and negative groups of probes 14 and 20 comprise a plurality of current carrying probes and a second plurality of voltage measuring probes dispersed among the current probes as explained above. In FIGS. 1 and 4, the current carrying probes located beneath the anode 12 (i.e., the negative probes) are designated by numeral 30 while numeral 32 designates the voltage probes. The current carrying probes located in positive probe group 20 above the anode are labeled 34 while the voltage probes are indicated by numeral 36.

Sequentially operated switches 38 and 40 are shown in FIG. 1 for individually and commonly connecting the voltage probes 32 and 36 to a voltage measuring device 42, indicated in FIG. 1, as a voltmeter. The voltage measuring device preferably includes a potentiometer or bridge circuit (not shown) to avoid undue loading of the measuring circuit and thereby provide more accurate voltage measurements.

An ammeter 43 is provided in the circuit of each current carrying probe, and an ammeter 44 is shown for measuring total current flow through the anode 12.

Figure 3:
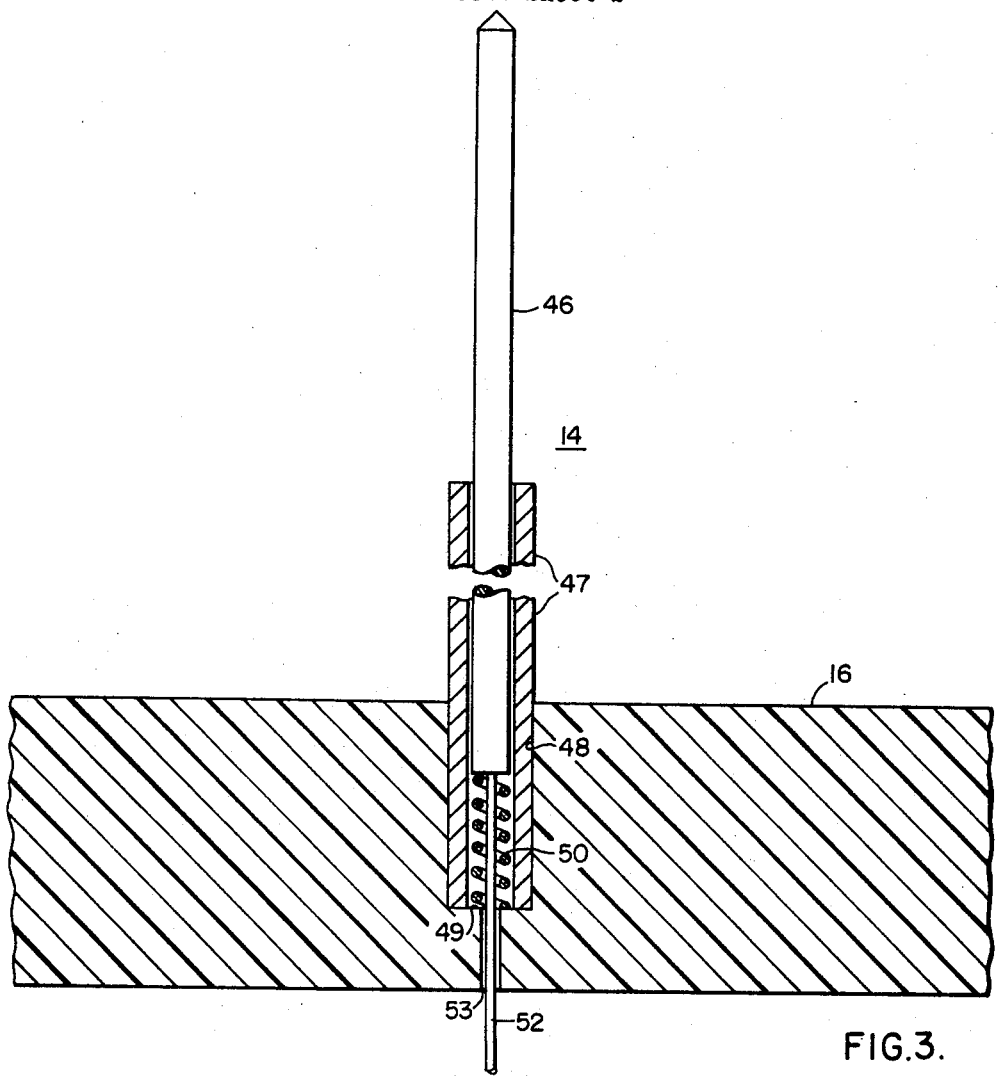
FIG. 3 is a vertical section of a probe representing all of the probes employed in the resistance measuring device of the invention.

Each probe of the probe groups 14 and 20 are preferably spring loaded to provide pressure on each probe and to thus maintain good electrical contact between the electrode and probes when the two are brought together. In FIG. 3, a spring loaded arrangement for each of the probes 14 and 20 is shown and is presently to be described.

As mentioned earlier, each probe is mounted in an insulating board type of structure 16. This structure, as shown in FIG. 3 has a substantial thickness dimension, two inches for example, and may be made of any suitable, rigid, insulating material having a strength sufficient to support a plurality of electrical conductive probes in the manner presently to be described.

More particularly, each probe comprises an elongated metal rod 46 (FIG. 3) located in a metal sleeve 47 mounted in a bore 48 provided in the insulating support member 16, the bore extending into the support member approximately two-thirds of the thickness of the member. The bore 48 provides a shoulder or ledge 49 in the insulating support member 16 upon which the inner end of the sleeve 47 seats.

Within the lower end of the tube 48, and between the lower end of the rod 46 and the ledge 49, is located a coil spring 50. Each of the springs has substantially the same spring coefficient thereby providing a uniform pressure on the rods of each probe.

The rod 46 is electrically connected to external circuitry by a wire 52 suitably attached to the inner end of the rod and extending through the spring 50, and through a hole 53 in the support member beneath the bore 48. The wire serves the additional function of holding the rod in the sleeve against the force of gravity for the positive probes 20 located over the anode and facing in a downwardly direction.

FIG. 2 of the drawings shows a cross sectional view of an oven or furnace 55, in combination with the resistance measuring probes 14 for heating an electrode, such as anode 12, to a temperature similar to that encountered in an operating electrolytic cell. At operating temperatures, the electrical resistance of an anode is lower usually by a factor of 16 percent than the same anode at room temperature using the probes 20. For this reason, it is preferable either to measure the resistance of all of the anodes selected for measurement at or near the operating temperature, or to establish a correction factor that will allow determination at room temperature of anode resistance at the operating temperature. This is explained in detail hereinafter.

The oven of FIG. 2 allows both options, i.e., the oven can remain unheated, and the test electrode disposed therein for testing at room temperature, or the oven can be heated to provide a heated environment corresponding closely to that of an operating cell. Structurely, the oven 55 comprises heat insulating, refractory side walls 56 having a peripheral, inwardly extending ledge 57 located about midway the height of the anode 12 shown located within the oven. Beneath the ledge are located electrical resistance heating bars 58 extending between and through the side and end walls of the furnace, only the side walls of the oven being shown in FIG. 2. As indicated in FIG. 2, the heating bars extend only along the ends and sides of the anode as well as below the bottom surface of the anode. The area heated by the bars 58 in combination with the ledge 57 function to simulate the bath level of an operating cell. Blankets 59 and 60 of a heat resistant material, a glass fiber material, for example, are located below and above the anode to maintain the heat within the furnace. The amount of glass fiber material placed on top of the anode simulates an $Al_2O_3$ protective covering on an operating anode. In this manner, the negative probes 14 of the resistance measuring device can extend through the blanket 59 to contact the bottom surface of the anode, as shown in FIG. 2, without causing substantial heat loss from the oven. In a similar manner, the positive probes 20 located above the anode (FIG. 1) can be easily inserted through the blanket 60 to electrically contact an unstubbed anode in the recess 24 thereof. (In FIG. 2, however, the anode is shown provided with a metal stub 26). A second ledge 61 is provided in the oven 55 for seating the anode over the probes 14, and nitrogen gas preferably purged through the furnace at elevated temperatures to reduce air burning of the anode.

To measure the electrical resistance of an electrode, and the reciprocal of resistance, namely, conductivity, in accordance with the invention, a surface of the electrode, the bottom surface of anode 12 for example, is disposed to engage the upwardly directed ends of the lower or negative probes 14 as shown in FIG. 1 and 2. If the anode is not stubbed, as shown in FIG. 1, the upper plurality of probes 20 are lowered into the recess 24. When the probes contact the bottom surface of the electrode, downward pressure is applied to the support board 22 in an amount sufficient to compress the springs 50 within the probes to insure good electrical contact between the probe ends and the electrode. Electrical power is then applied to the probes, by the closing of a line switch 62, for example, and thus across the electrode 12. The flow of current through the electrode follows a plurality of spaced paths between the locations of the current carrying probes 34 in the electrode recess 24 and the current carrying probes 30 contacting the bottom surface of the electrode. Since the probes 30 are spaced apart over a substantial area of the bottom surface of the electrode, the current paths between the recess 24 and the bottom surface spread outwardly from the recess to provide current flow through a broad, cross sectional area of the electrode. The amount of current flow in each of these paths is indicated by the ammeters 43 connected in the individual circuits of the current carrying probes.

To obtain a measurement of electrode homogeniety the sequence switches 38 and 40 are operated to provide individual readings on the meter 42 between the upper and lower voltage probes 32 and 36. For example, with nine voltage probes contacting the bottom surface of the electrode, as indicated by the Xs in FIG. 4, and four voltage probes engaging the electrode in recess 24, a combination of 36 voltage readings across the electrode are possible. The consistency of these readings indicate the degree at which the internal structure of the electrode is uniform and homogenous. As explained above, voids and horizontal laminations in the compacted mix of the electrode lengthen current paths through and thus increase the voltage drops across the electrode. The individual voltage readings afforded by the spaced voltage probes and the switches 38 and 40 provide rapid determination of such voids and laminations.

To obtain a voltage measurement for the determination of electrode resistance, the average voltage drop across the electrode is obtained. This may be obtained by commonly connecting the negative voltage probes 32 together on one side of the meter 42, and the positive voltage probes 36 on the other side of the meter. This is accomplished in FIG. 1 by moving the contact arm of switch 38 to a contact 66. The contact 66 is commonly connected to six low resistance resistors 67 which are connected respectively to the six negative voltage probes 32 in FIG. 1. In the same manner, the positive voltage probes 36 may be commonly connected to the voltmeter through resistors 69 by moving the arm of switch 40 to a contact 68. The total current reading on the ammeter 44, and average voltage, as measured by the voltmeter 42, are used to determine electrode resistance via ohm's laws, i.e., by dividing the voltage reading by the current reading.

To measure the resistance of anode already stubbed (FIG. 2), which can be measured only at operating temperatures, the positive probes 20 are not used. Instead, a lead 64 is simply connected to the stub 26, as shown in FIG. 2, for connection to the positive side of the power supply 28 while the negative side is connected in the manner shown in FIG. 1. Current is directed into the anode by the stub, and through the anode to the negative current probes 30 engaging the bottom surface of the anode. To measure the voltage drop across the stubbed anode, as well as the stub to carbon voltage drop, a second lead (not shown) is connected between the voltmeter 42 and the stub. Again, this measurement must be at an operating temperature so that the stub collar 27 will expand to make good electrical contact between the stub and the sides of the stub hole.

To determine the influence of the sides of a stubbed recess 24, a hole or holes may be downwardly, angularly drilled through the stub 26 and cast collar 27 to the sides of the recess. An insulated voltage probe or probes (not shown) are then inserted in the drilled holes to contact the sides of the stubbed recess. By taking a complete set of readings on an unstubbed anode using the upper group of probes 20, and then stubbing the anode, and using the insulated probes as described above, a comparison can be made as to the degree of current flow from the sides of the anode recess.

To determine the resistance of an electrode at or near the temperature of its operation in an electrolytic cell, which resistance is the resistance at which the electrode will actually function, the electrode is placed in the oven 55 of FIG. 2. The lower, negative probes 14 are positioned in such a manner that the plane of their upper ends is located slightly above that of the ledge 61 upon which the electrode rests. When the electrode is placed in the oven, the bottom surface thereof engages the upper ends of the probes and forces them downwardly against the force of their respective coil springs 50 (FIG. 3). In this manner, good electrical contact is made between the electrode 12 and the probes 14 even if the contacted surface of the electrode is somewhat irregular or uneven.

With the electrode 12 so disposed, the heating bars are energized from a suitable source of current (not shown) to heat the electrode to temperature and temperature gradient at least approximating that of an operating cell. Since, as explained earlier, the operating resistance of an electrode is lower than that resistance at room temperature, it is desirable to determine electrode resistance at or near its operating temperature. This resistance is determined in the manner described above in connection with stubbed and unstubbed electrodes.

Since the temperature within the oven 55 is quite high, i.e., on order of 960°C, the rods 46 of the probes 14 and 20, which extend into the oven are made of heat resistant metal such as non-thoriated tungsten. The sleeves 47, on the other hand, may be stainless steel since they are located at a distance from the direct heat of the oven. Preferably, the sleeves 47 do not extend through the heat resistant blankets 59 and 60. However, in measuring electrode resistance at room temperature, the cost of the probes can be substantially reduced by using stainless steel rods 46 instead of the more costly tungsten.

In addition, as mentioned earlier, the oven 55 is useful in providing a correction factor for testing electrodes at room temperature to determine their resistance at an operating temperature without actually heating such electrodes to or near the operating temperature. This is accomplished by measuring the resistance of at least one electrode at room temperature and at or near the operating temperature (to determine its operating resistance) with the measuring device 10 of the invention. The difference in the resistance measured between the two temperatures is used as a correction factor to measure further anodes at room temperature without further use of the oven 55, though from time to time, the oven may be employed to confirm or change the correction factor. The number of electrodes used to determine the correction factor will depend upon the quality of the electrodes being produced. With a process providing a consistent, high quality product, only one electrode need be heated to obtain the correction factor. With quality being inconsistent, several electrodes would have to be tested in the oven 55, and their resistance readings averaged to obtain the correction factor.

In addition, with the correction factor permitting electrode testing at room temperature, the above-mentioned, lower cost stainless steel rods 46 can be used thereby considerably reducing the cost of the test device 10.

From the foregoing description it should now be apparent that a new and useful method and device has been disclosed for determining the electrical resistance and quality of carbonaceous electrodes. This is accomplished by at least one group of electrically conductive, spaced apart probes disposed to engage a first surface of each electrode, in combination with a power source and a second electrically conductive means engaging a second surface or portion of the electrode spaced from the first surface. The spaced apart probes provide a plurality of spaced current flow paths through the electrode over a broad cross sectional area thereof, the measuring of the magnitude current flow through the paths providing a thorough determination of the internal quality and integrity, and thus current carrying capabilities, of the electrode. The significance of the electrode quality and electrical conductivity is reflected in the operational efficiency of electrolytic cells which employ many such electrodes. A relatively large voltage drop across cell electrodes, resulting from high electrical resistance of the electrode, results in decreased cell current potential across the cell with consequential reduction in metal production unless additional power is available. If it is available, then the increased cost is reflected in the cost of the additional power.

While the invention has been described in terms of preferred embodiments, the claims appended hereto are intended to encompass all embodiments which fall within the spirit of the invention.

Having thus described my invention and certain embodiments thereof, I claim:

1. A method of measuring the electrical resistance of carbonaceous electrode, the method comprising the steps of placing a group of spaced apart, electrically conductive probes in electrical contact with a surface of said electrode, said group of probes comprising a plurality of current carrying probes and a plurality of voltage measuring probes, placing a second current carrying means in electrical contact with a portion of said electrode spaced from said surface, applying a source of potential across said electrode via the current carrying probes and the second current carrying means, and thereby providing a plurality of paths of current flow through said electrode between the surface contacted by said probes and the portion contacted by said second current carrying means, measuring the average voltage drop across said electrode between the portion of said electrode contacted by the second current carrying means and the plurality of voltage measuring probes, measuring the current flow through said electrode along each of the paths of said current flow, as well as the total current flow through said electrode, and determining the average electrical resistance of said electrode by dividing the average voltage drop by the total current flow through said electrode.

2. A method of measuring the electrical resistance of carbonaceous electrodes for use in an electrolytic cell, the method comprising the steps of heating a first carbonaceous electrode to a temperature approximating that encountered in an operating electrolytic cell, placing a plurality of spaced apart, electrically conductive probes in electrical contact with a surface of said heated electrode, said group of probes comprising a plurality of current carrying probes and a plurality of voltage measuring probes, placing a second current carrying means in electrical contact with a portion of said electrode spaced from said surface, applying a source of potential across said electrode via the current carrying probes and the second current carrying means, and thereby providing a plurality of paths of current flow through said electrode between said surface and the portion of said electrode spaced from the surface, measuring the average voltage drop across said electrode and the current flow through the electrode along each of the paths of said current flow, as well as the total current flow through said electrode, determining the average resistance of said electrode by dividing the average voltage drop by the total current flow through said electrode, performing the above measuring and resistance determining steps with said electrode at room temperature to obtain the differential measurement of electrical resistance between the electrode at the operating temperature and at room temperature, performing the above measuring and resistance determining steps with further electrodes at room temperature, and using said differential measurement as a correction factor for said further electrodes to determine, at room temperature, their resistance at the operating temperature.

3. In combination with an oven for heating a carbonaceous electrode to a temperature approximating that encountered in an operating electrolytic cell, a device for measuring the electrical resistance of said electrode at said temperature comprising a group of spaced apart, electrically conductive probes for electrically contacting a surface of said electrode at corresponding spaced apart locations, said group of probes comprising a plurality of current carrying probes and a plurality of voltage measuring probes, means for supporting said probes in said spaced apart manner, second current carrying means electrically contacting a portion of said electrode spaced from said surface, a source of voltage connected to the plurality of current carrying probes and to said second current carrying means for applying a potential across said electrode, said source of voltage in combination with the group of probes and the second current carrying means providing a plurality of paths of current flow through said electrode between the electrode surface contacted by the group of probes and the electrode portion spaced therefrom, and means for indicating the average voltage drop across the electrode, and for indicating the amount of current flow along each of said current paths, as well as the total current flow through said electrode.

4. A device for measuring the electrical resistance of an electrode made of a carbonaceous material, said device comprising a plurality of spaced apart, electrically conductive probes for electrically contacting a surface of said electrode at corresponding spaced apart locations, said plurality of probes including a plurality of current carrying probes and a plurality of probes for obtaining voltage measurements, means for supporting said probes in said spaced apart manner, second current carrying means for electrically contacting said electrode at a surface spaced from said surface, a source of voltage connected to the plurality of current carrying probes and to said second current carrying means for applying a potential across said electrode, and thereby providing a plurality of current flow paths between the surface contacted by said probes and the location contacted by the second current carrying means, means for indicating the average voltage drop across the electrode and for indicating the amount of current flow along each of said current paths, and means for indicating the total flow of current through said electrode.

5. The device of claim 5 in which the carbonaceous electrode is provided with a recess at a location opposed to the electrode surface contacted by the group of probes, and the second current carrying means comprises a second group of current carrying and voltage measuring probes for positioning in said recess and in electrical contact with the electrode in said recess.

6. The device of claim 4 in which the voltage measuring probes are uniformly dispersed with the current carrying probes.

* * * * *